United States Patent
Nguyen et al.

(10) Patent No.: US 9,846,964 B2
(45) Date of Patent: Dec. 19, 2017

(54) MULTI-Z POLYLINE TO SINGLE-Z HORIZONS CONVERSION

(71) Applicant: LANDMARK GRAPHICS CORPORATION, Houston, TX (US)

(72) Inventors: Nam X. Nguyen, Katy, TX (US); Scott D. Senften, Sugar Land, TX (US); Mary J. Cole, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 15/122,923

(22) PCT Filed: Apr. 1, 2014

(86) PCT No.: PCT/US2014/032576
§ 371 (c)(1),
(2) Date: Aug. 31, 2016

(87) PCT Pub. No.: WO2015/152903
PCT Pub. Date: Oct. 8, 2015

(65) Prior Publication Data
US 2017/0076492 A1     Mar. 16, 2017

(51) Int. Cl.
*G06T 17/05* (2011.01)
*G01V 1/30* (2006.01)
(Continued)

(52) U.S. Cl.
CPC .............. *G06T 17/05* (2013.01); *G01V 1/302* (2013.01); *G06T 11/203* (2013.01); *G06T 15/40* (2013.01);
(Continued)

(58) Field of Classification Search
None
See application file for complete search history.

(56) References Cited

U.S. PATENT DOCUMENTS

| | | | |
|---|---|---|---|
| 2004/0054475 A1* | 3/2004 | Grace | G06T 17/20 702/1 |
| 2006/0089806 A1 | 4/2006 | Fitzsimmons et al. | |

(Continued)

FOREIGN PATENT DOCUMENTS

EP     1279049 B1     10/2008

OTHER PUBLICATIONS

PCT Search Report for PCT Application No. PCT/US2014/032576 dated Jan. 14, 2015.
(Continued)

*Primary Examiner* — Michelle Chin
(74) *Attorney, Agent, or Firm* — Locke Lord LLP

(57) ABSTRACT

Method and system for 3-D imaging of subterranean geologic structures based on seismic data interpretations involves converting multi-Z polylines into single-Z line segments. The single-Z line segments have slopes that are either positive or negative and do not change signs. As a result, no point along the line segment has more than one value in Z. The single-Z line segments may then be grouped or assembled into lattices that may then be used to form single-z horizons. Such a method and system arrangement provide a far more efficient and less processing intensive way to render 3-D images of the geologic structures compared to existing solutions.

17 Claims, 10 Drawing Sheets

(51) Int. Cl.
    *G06T 15/40* (2011.01)
    *G06T 17/00* (2006.01)
    *G06T 11/20* (2006.01)

(52) U.S. Cl.
    CPC .......... *G06T 17/00* (2013.01); *G01V 2210/64* (2013.01); *G01V 2210/641* (2013.01)

(56) References Cited

U.S. PATENT DOCUMENTS

2011/0091078 A1    4/2011  Kherroubi et al.
2012/0032962 A1    2/2012  Yeh

OTHER PUBLICATIONS

PCT Written Opinion for PCT Application No. PCT/US2014/032576 dated Jan. 14, 2015.
Examiners Letter for Canadian Application No. 2939957 dated Jun. 6, 2017.

* cited by examiner

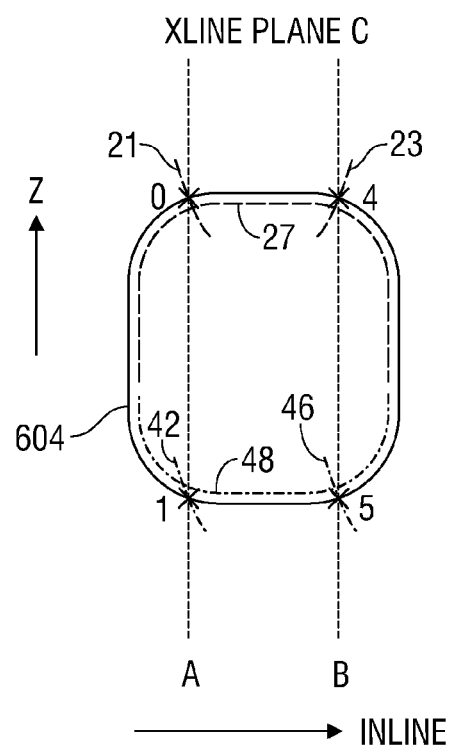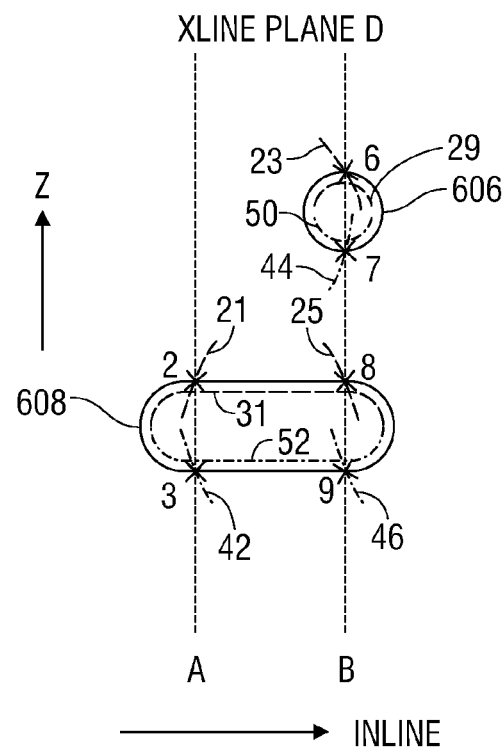
FIG. 6C  FIG. 6D

MULTI-Z POLYLINE TO SINGLE-Z HORIZONS CONVERSION

FIELD OF THE INVENTION

The exemplary embodiments disclosed herein relate generally to techniques for 3-D imaging and modeling of subterranean geologic structures using seismic data acquired from seismic reflection surveys taken of the subterranean formations, and particularly to a computer-implemented method, system, and computer program product for converting multi-Z polylines into single-Z line segments that may then be used to generate single-Z horizons or height fields.

BACKGROUND OF THE INVENTION

Seismic reflection surveys can reveal many structural details about a subterranean formation, including the location of subterranean faults, mineral deposits, and the like. It is desirable to accurately image and model the location and extent of these geologic structures owing to their importance in a number of commercial applications. For example, in hydrocarbon exploration, it is important to accurately model salt bodies and similar structures because such salt bodies are known to trap significant amounts of oil and gas in the formation underneath.

A common and widely used method of generating 3-D images of a salt body from seismic reflection surveys is to define the salt boundaries using horizons or height fields. Typically, an upward-facing or top horizon and a downward-facing or bottom horizon are defined for the salt body, then the salt structure between the top and bottom horizons is filled in by performing a flood fill. The data representing the horizons is usually stored and processed by imaging software using a 2-D array or grid where the elements in the grid represent points on the surface of the salt body in the horizontal direction (i.e., X and Y axes), and the value contained in each element indicates the depth (i.e., Z axis) of the salt boundary at that point.

However, constructing an accurate and realistic model of a salt body is inherently difficult because the nature of salt makes the seismic data noisy and poorly defined. In most cases, geologists and geophysicists must interpret the volumes of seismic data using their geological knowledge and experience to manually define the edge of the salt body as it is intersected by an individual vertical plane (section) and horizontal plane (slice). These seismic interpretations typically contain data points that were deemed by the geologists and geophysicists as most indicative of the boundary of the salt body. The data points are then input into imaging software, which connects the points together to form a set of polylines that outline the contour of the salt body. The imaging software then fills in the area between the polylines using the 2-D array or grid to render a 3-D image of the salt body.

Because salt bodies are closed structures, the polylines almost always encircle the salt body and are therefore almost always closed-ended. This means virtually every element in the 2-D array or grid for the image of a salt body will have at least two values in Z, with some elements having as many as four or more Z values, depending on the shape of the salt body. These multi-Z polylines are extremely computationally intensive and require a significant amount of processing power, making it difficult and time-consuming for the imaging software to render the salt body image or model.

A need therefore exists for improved techniques for 3-D imaging and modeling of subterranean geologic structures, and particularly for an efficient and less processing intensive way to render 3-D images of the geologic structures.

BRIEF DESCRIPTION OF THE DRAWINGS

The foregoing and other advantages of the exemplary disclosed embodiments will become apparent upon reading the following detailed description and upon reference to the drawings, wherein:

FIGS. 6A-6D are exemplary multi-Z polylines and corresponding single-Z line segments according to the exemplary disclosed embodiments;

DETAILED DESCRIPTION OF THE DISCLOSED EMBODIMENTS

As an initial matter, it will be appreciated that the development of an actual, real commercial application incorporating aspects of the exemplary disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

The exemplary disclosed embodiments relate to a computer-implemented method, system, and computer program product for 3-D imaging and modeling of subterranean geologic structures using seismic data. The embodiments involve converting multi-Z polylines into single-Z segments that may then be used to generate single-Z horizons or height fields for the geologic structures. It should be noted that although the following description and the figures focus on imaging salt bodies, the principles and teachings disclosed herein may also be applied to imaging other types of geologic structures by those having ordinary skill in the art.

Figure 1:
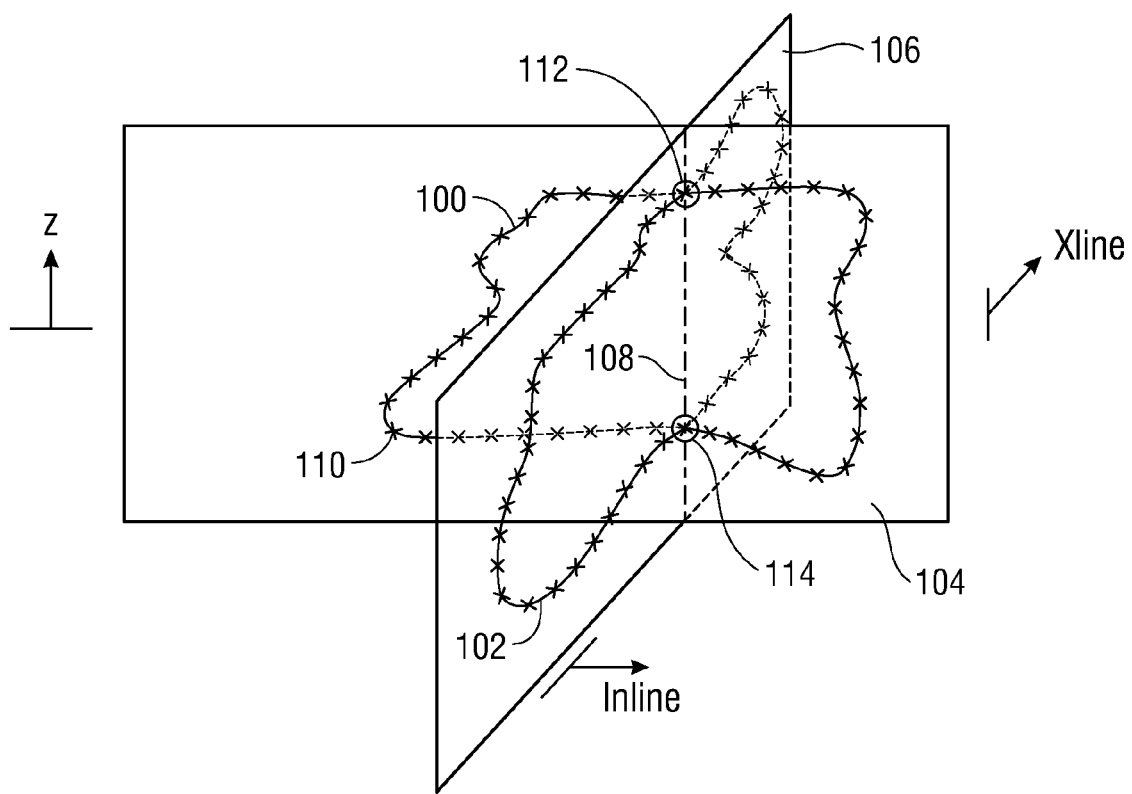
FIG. 1 is an example of multi-Z polylines that may be converted to single-Z line segments according to the exemplary disclosed embodiments.

Turning now to FIG. 1, an example of multi-Z polylines for a subterranean salt body is shown that are produced from data points or sample points manually selected by geologists and geophysicists. It is of course possible for the multi-Z polylines to be produced using automatically selected sample points without departing from the scope of the disclosed embodiments, as the particular way in which the sample points are selected is not critical to the practice of embodiments. Only two multi-Z polylines 100 and 102 are shown here for clarity and economy of the description, whereas a typical 3-D salt body image may include several dozen multi-Z polylines or more.

As can be seen, one multi-Z polyline 100 lies in an inline plane 104 while the other multi-Z polyline 102 lies in an xline plane 106. The inline plane 104 and the xline plane 106 are orthogonal to one another and intersect each other along the dashed line indicated at 108. Depth is indicated by the Z indicator. Along each polyline 100 and 102 are a plurality of small crosses resembling x's, one of which is indicated at 110, that represent data points or sample points manually selected by the geologists and geophysicists. The two polylines 100 and 102 intersect each other at the two circled intersection points 112 and 114 along the dashed line 108. In accordance with the exemplary disclosed embodiments, such multi-Z polylines 100 and 102 may be converted to their single-Z line segments as described herein in order to make rendering of the 3-D salt body image more efficient and less processor-intensive.

Figure 2:
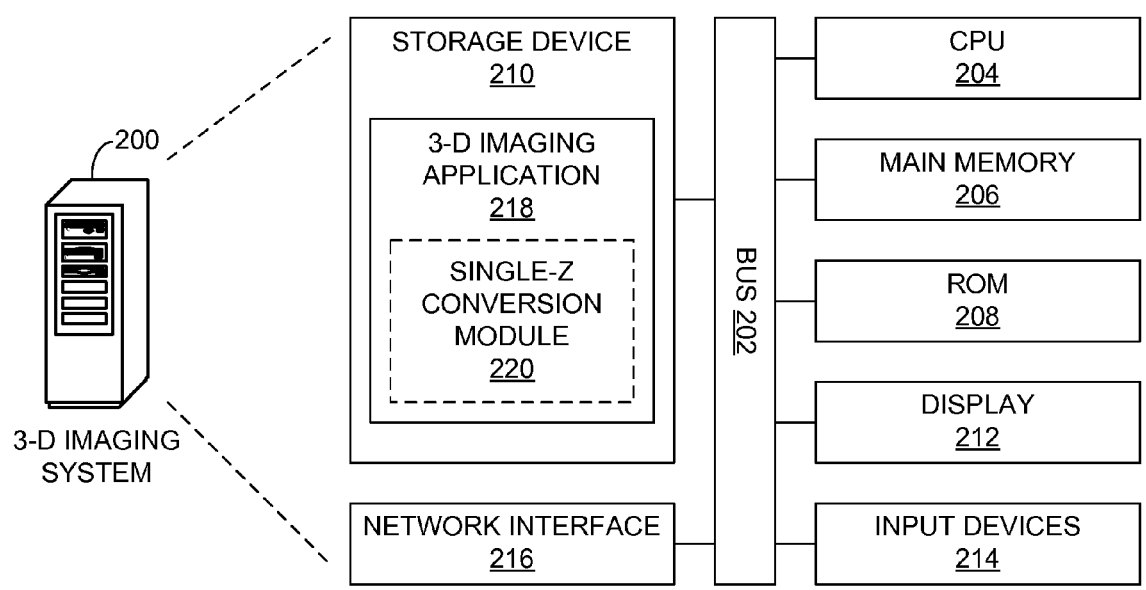
FIG. 2 is an example of a system that may be used to convert multi-Z polylines to single-Z line segments according to the exemplary disclosed embodiments.

An example of a 3-D imaging system that can reduce multi-Z polylines to their single-Z line segments according to the exemplary disclosed embodiments is depicted generally in FIG. 2 at 200. As seen in FIG. 2, the exemplary 3-D imaging system 200 may be a conventional workstation, desktop, or laptop computer, or it may be a custom computing system developed for a particular application. In a typical arrangement, the system 200 includes a bus 202 or other communication pathway for transferring information within the 3-D imaging system 200, and a CPU 204 coupled with the bus 202 for processing the information. The 3-D imaging system 200 may also include a main memory 206, such as a random access memory (RAM) or other dynamic storage device coupled to the bus 202 for storing computer-readable instructions to be executed by the CPU 204. The main memory 206 may also be used for storing temporary variables or other intermediate information during execution of the instructions to be executed by the CPU 204.

The 3-D imaging system 200 may further include a read-only memory (ROM) 208 or other static storage device coupled to the bus 202 for storing static information and instructions for the CPU 204. A computer-readable storage device 210, such as a nonvolatile memory (e.g., Flash memory) drive or magnetic disk, may be coupled to the bus 202 for storing information and instructions for the CPU 204. The CPU 204 may also be coupled via the bus 202 to a display 212 for displaying information to a user. One or more input devices 214, including alphanumeric and other keyboards, mouse, trackball, cursor direction keys, and so forth, may be coupled to the bus 202 for communicating information and command selections to the CPU 204. A network or communications interface 216 may be provided for allowing the 3-D imaging system 200 to receive or input data and otherwise communicate with an external device, system, or network.

The term "computer-readable instructions" as used above refers to any instructions that may be performed by the CPU 204 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 210. Volatile media may include dynamic memory, such as main memory 206. Transmission media may include coaxial cables, copper wire and fiber optics, including wires of the bus 202. Transmission itself may take the form of electromagnetic, acoustic or light waves, such as those generated during radio frequency (RF) and infrared (IR) data communications. Common forms of computer-readable media may include, for example, magnetic medium, optical medium, memory chip, and any other medium from which a computer can read.

A 3-D imaging application 218, or rather the computer-readable instructions therefor, may also reside on or be downloaded to the storage device 210. In general, the 3-D imaging application 218 is a computer program that can receive or input a plurality of data points reflecting seismic interpretations and render a 3-D image of a geologic structure, such as a salt body, based on those data points. Examples of commercially available 3-D imaging applications may include DecisionSpace® Geophysics from Landmark Graphics Corporation. The 3-D imaging application 218 may be executed by the CPU 204 and/or other components of the 3-D imaging system 200 to generate a model or image of the geologic structure. Such a 3-D imaging application 218 may be written in any suitable computer programming language known to those having ordinary skill in the art using any suitable software development environment known to those having ordinary skill in the art. Examples of suitable programming languages may include C, C++, C#, FORTRAN, MATLAB (from The MathWorks, Inc.), and LabVIEW (from National Instruments, Inc.), and the like. Examples of suitable software development environments include Visual Studio from Microsoft Corporation, and the like.

In accordance with the exemplary disclosed embodiments, the 3-D imaging application 218 may include among its features and capabilities a single-Z conversion module 220. As the name suggests, the single-Z conversion module 220 is capable of receiving or inputting the seismic interpretations for a geologic structure and converting that data, which would otherwise be processed as multi-Z polylines, into single-Z line segments. The single-Z segments may then be used to compose single-Z horizons or height fields for the geologic structure. This allows the 3-D imaging application 218 to draw or render the geologic structure in a manner that is more efficient and requires much less processing power.

Figure 3:
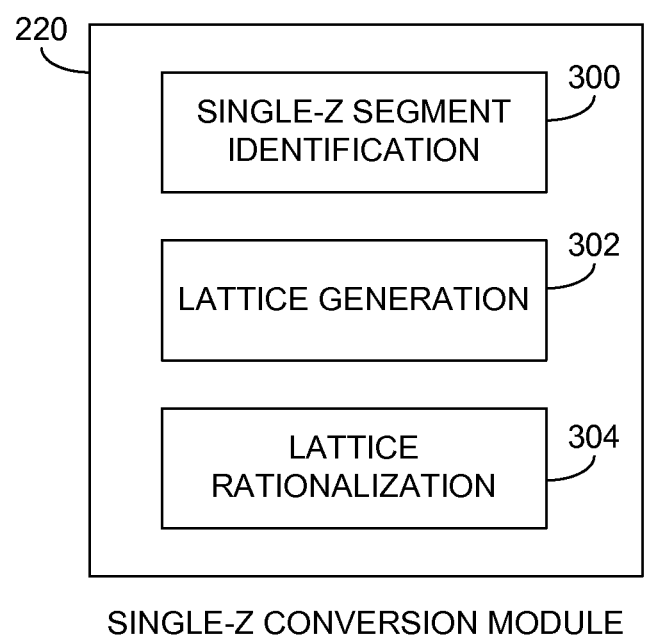
FIG. 3 is an example of an application that may be used to convert multi-Z polylines to single-Z line segments according to the exemplary disclosed embodiments.

FIG. 3 illustrates the single-Z conversion module 220 in more detail according to the embodiments disclosed herein. As can be seen, the single-Z conversion module 220 is composed of several functional components that, in some embodiments, may be software components, hardware components, or a combination of software and hardware components. These functional components may include a single-Z line segment identification sub-module 300 that is capable of analyzing the seismic interpretations for a geologic structure and identifying single-Z line segments from the interpretations. The functional components may also include a lattice generation sub-module 302 that operates to combine the single-Z line segments identified by the single-Z line segment identification sub-module 300 into individual groups or lattices of related segments. As well, the functional components may include a lattice rationalization sub-module 304 that functions to rationalize or break up each lattice as needed to ensure that no lattice folds back upon itself or overlaps itself.

Figure 4:
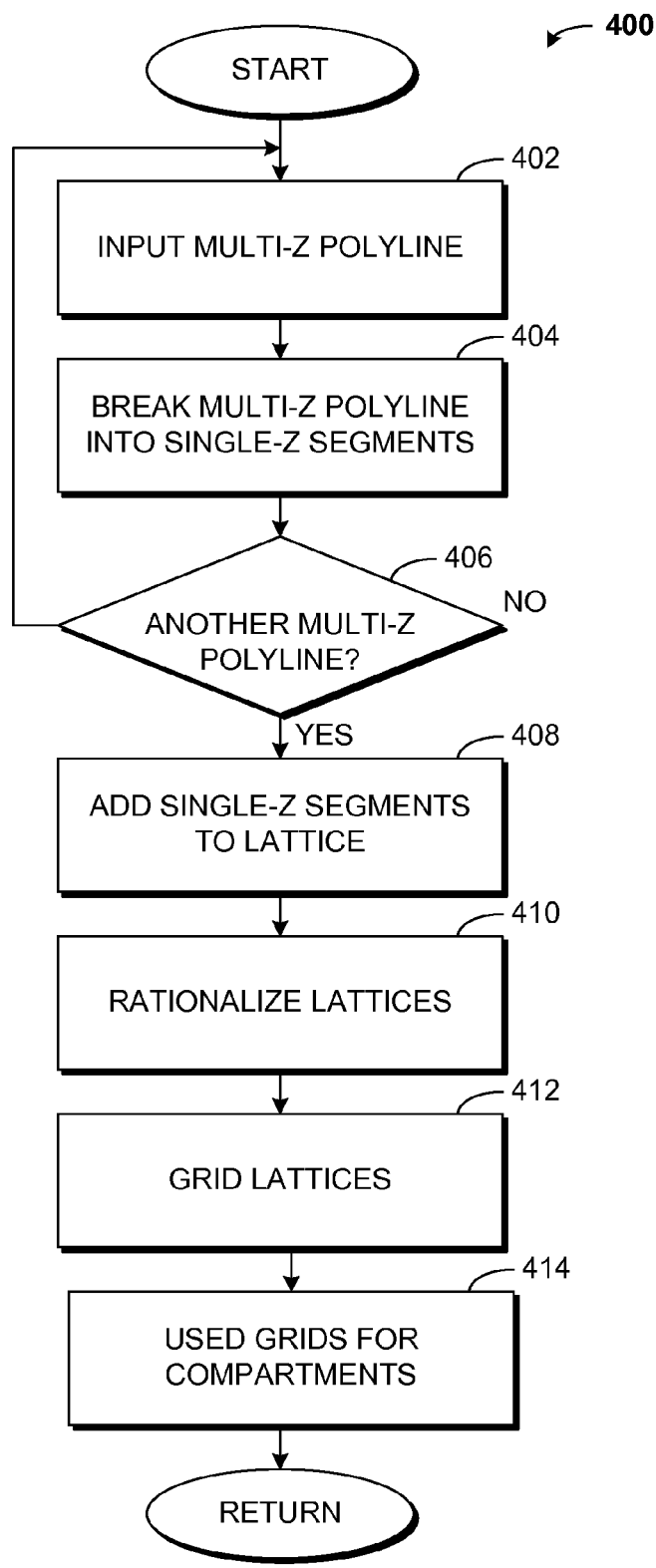
FIG. 4 is an exemplary flowchart that may be used for converting multi-Z polylines to single-Z line segments according to the exemplary disclosed embodiments.

General operation of the single-Z conversion module 220, and the sub-modules 300-304 therein, is depicted in FIG. 4 via a flow chart 400. Although the flow chart 400 shows a number of discrete blocks, it should be understood that any block may be divided into two more constituent blocks, and that two or more blocks may be combined to form a single block, without departing from the scope of the exemplary disclosed embodiments. Also, although the various blocks are arranged in a particular sequence in FIG. 4, it should be understood that one or more of the blocks may be performed outside the sequence shown, or omitted altogether in some cases, without departing from the scope of the exemplary disclosed embodiments.

As can be seen in FIG. 4, in general, the single-Z conversion module 220 begins by receiving a multi-Z polyline reflecting a set of seismic interpretations at block 402. At block 404, the single-Z conversion module 220 breaks, divides, or otherwise reduces the multi-Z polyline into a plurality of contiguous single-Z line segments. Specifically, the single-Z conversion module 220 identifies sections or segments along the multi-Z polyline such that no point along an individual segment has more than one value in Z. This identification process continues until the entire multi-Z polyline has been converted to single-Z line segments. The single-Z conversion module 220 also assigns every single-Z line segments a unique identifier that allows it to be referenced as needed. The unique identifiers for the single-Z line segments may be any suitable identifier, such as an integer value, a numeric or alphanumeric sequence reflecting the relationship between the single-Z line segments and the multi-Z polyline, and the like.

Once the multi-Z polyline has been reduced to single-Z line segments, the single-Z conversion module 220 determines at block 406 whether there are additional multi-Z polylines that need to be converted. If the determination is yes, then the above process is repeated for the additional multi-Z polylines. If the determination is no, then the single-Z conversion module 220 groups or otherwise assembles the single-Z line segments into one or more lattices at block 408, as explained in more detail herein. At block 410, the lattices are rationalized or broken up as needed to ensure that no lattice folds back upon itself or overlaps itself. Thereafter, the rationalized lattices are gridded at block 412 and used to form compartments at block 414 in a manner well known to those having ordinary skill in the art.

Figure 5:
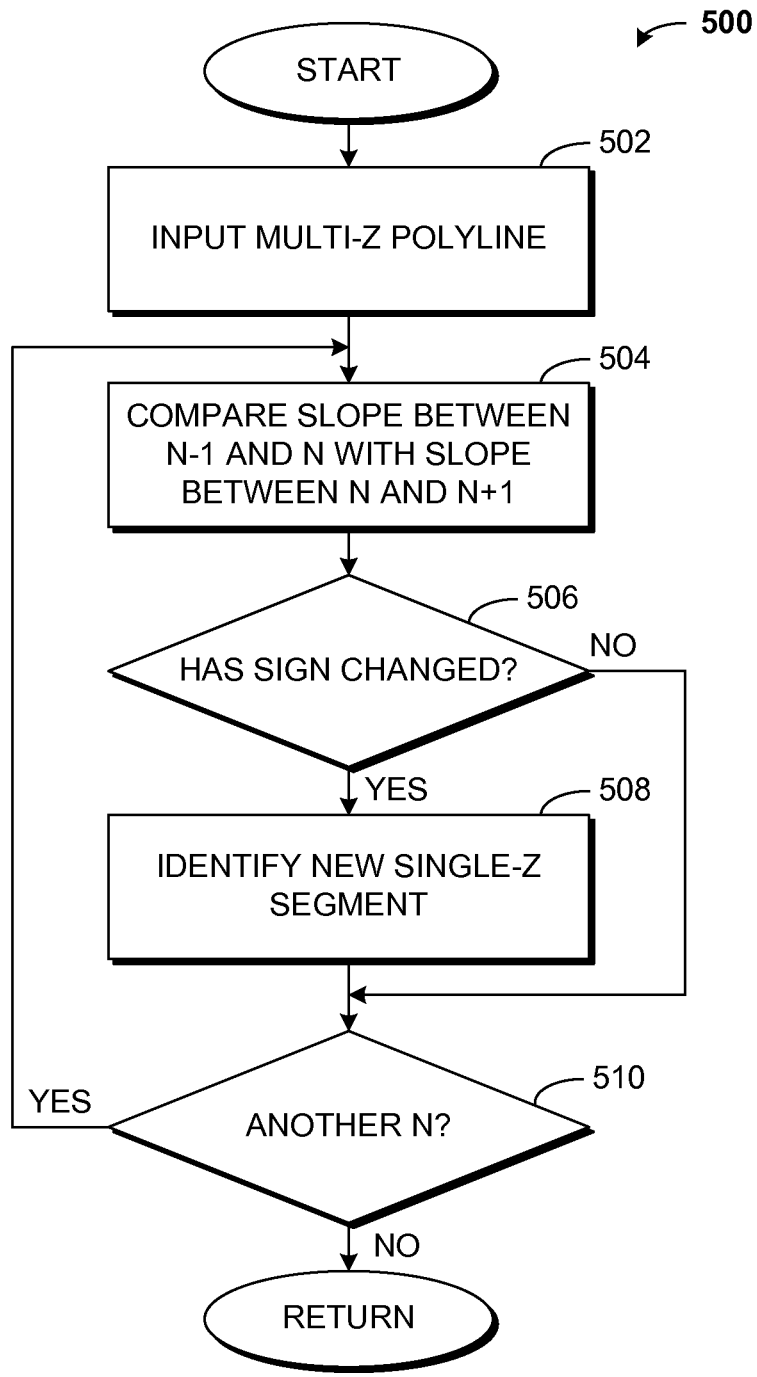
FIG. 5 is an exemplary flowchart that may be used for identifying single-Z line segments according to the exemplary disclosed embodiments.

FIG. 5 shows an exemplary flowchart 500 of the steps that the single-Z conversion module 220, and specifically the single-Z segment identification sub-module 300 therein, may use for the single-Z line segment identification block 404 (see FIG. 4). In general, the identification of single-Z line segments begins with receiving a multi-Z polyline at block 502. At block 504, the slope or average slope of a line segment along the multi-Z polyline between a given sample point N−1 and the next sample point N is determined, and a comparison is made between that slope and the slope or average slope of a line segment between sample point N and sample point N+1. A determination is made at block 506 whether the comparison of the slope or average slope of the two line segments resulted in a sign change from positive to negative or vice versa, which would indicate the multi-Z polyline is starting to bend back around. If the determination at block 506 is yes, then a new single-Z line segment is identified at block 508 starting from sample point N. If the determination at block 506 is no, then the line segment starting from sample point N is simply added to the existing contiguous line segment and no new single-Z line segment is identified. This process ensures no line segment has a slope that changes sign from positive to negative or vice versa, and therefore no point along the line segment has more than one value in Z. Thereafter, at block 510, a determination is made as to whether there are additional sample points for which a slope comparison is needed. The above process then either continues or terminates based on the outcome of this determination.

In addition to identifying new single-Z line segments, the single-Z conversion module 220 may also use the slope change comparisons of block 508 to identify whether the single-Z line segments belong in the top or bottom horizon. In some embodiments, the single-Z conversion module 220 may perform the top or bottom horizon determination by traversing the multi-Z polyline in a clockwise direction according to the orientation of the polyline. Then, a sign change in the slope between successive line segments not only indicates the start of a new single-Z line segment, but also indicates the horizon for the new single-Z line segment. Specifically, a sign change from positive to negative indicates the new single-Z line segment belongs in the bottom horizon, whereas a sign change from negative to positive indicates the new single-Z line segment belongs in the top horizon.

Figure 6A:
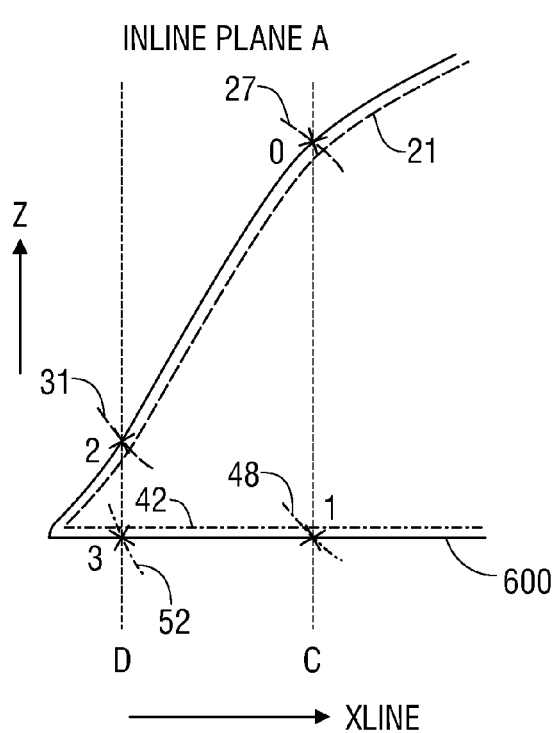
Figure 6B:
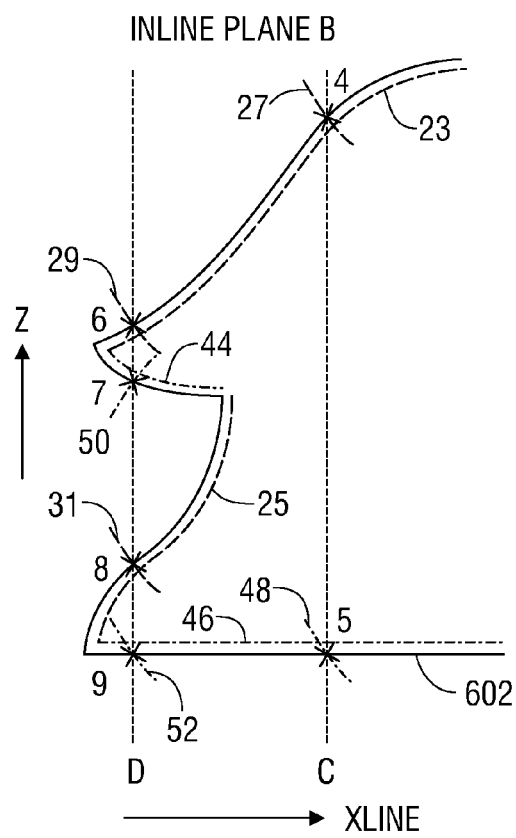

FIGS. 6A-6D illustrate examples of multi-Z polylines and their corresponding single-Z line segments that may be identified by the single-Z conversion module 220 according to the exemplary embodiments disclosed herein. Referring first to FIGS. 6A and 6B, inline planes labeled A and B are shown, respectively, that are parallel to one another and to the surface of the page. FIGS. 6C and 6D show xline planes labeled C and D, respectively, that are parallel to one another and to the surface of the page, but orthogonal to the inline planes A and B. The relative orientations may be seen in FIGS. 6A and 6B where the xline planes C and D are designated with short-dash lines labeled C and D, respectively, and likewise in FIGS. 6C and 6D where the inline planes A and B are designated with short-dash lines labeled A and B, respectively.

Referring still to FIGS. 6A-6D, solid lines within the various planes represent multi-Z polylines similar to those commonly rendered in a typical workflow based on seismic interpretations. The long dash lines and the dash-dot lines represent single-Z line segments corresponding to the multi-Z polylines identified according to the exemplary disclosed embodiments. In particular, the long dash lines represent single-Z line segments that reside in one of the height fields, for example, the top horizon, whereas the dash-dot lines represent single-Z line segments that reside in the other height field, for example, the bottom horizon. Here, the small crosses resembling x's represent points where the various inline and xline multi-Z polylines intersect one another.

Turning now to FIG. 6A, a portion of an inline multi-Z polyline is shown, as represented by the solid line 600. This portion of the inline multi-Z polyline 600 may be reduced by the single-Z conversion module 220 in the manner described above to a top horizon single-Z line segment 21 and a bottom horizon single-Z line segment 42. At least four xline multi-Z polylines intersect the inline multi-Z polyline 600 at intersection points 0, 1, 2, and 3. These four xline multi-Z polylines may also be reduced in the manner described above to a top horizon single-Z line segment 27 that crosses intersection point 0, a bottom horizon single-Z line segment 48 that crosses intersection point 1, another top horizon single-Z line segment 31 that crosses intersection point 2, and another bottom horizon single-Z line segment 52 that crosses intersection point 3.

The intersection points 0 and 1 from FIG. 6A may also be seen in FIG. 6C, along with the xline single-Z line segments 27 and 48 extending through these intersection points. Looking at FIG. 6C, it can be seen that the single-Z line segments 27 and 48 from FIG. 6A actually correspond to an xline multi-Z polyline 604. To avoid clutter, this xline multi-Z polyline 604 is not specifically depicted in FIG. 6A, which instead shows the corresponding single-Z line segments 27 and 48 for clarity. FIG. 6C also shows the inline single-Z line segments 21 and 42 from FIG. 6A extending through the intersection points 0 and 1.

The other intersection points from FIG. 6A, points 2 and 3, may also be seen in FIG. D, along with the xline single-Z line segments 31 and 52 extending through them. These single-Z line segments 31 and 52 correspond to xline multi-Z polyline 608. Again, to avoid clutter, this xline multi-Z polyline 608 is not specifically depicted in FIG. 6A, which shows the single-Z line segments 31 and 52 instead for clarity.

The remaining inline and xline multi-Z polylines in FIGS. 6A-6D, their corresponding inline and xline single-Z line segments, as well as the various intersection points, may be cross referenced to one another in the same fashion as above. For example, FIG. 6B shows a portion of an inline multi-Z polyline 602, two top horizon single-Z line segments 23 and 25 resulting therefrom, two bottom horizon single-Z line segments 44 and 46 resulting therefrom, and six intersection points 4, 5, 6, 7, 8, and 9 that are intersected, respectively, by six single-Z line segments 27, 48, 29, 50, 31, and 52. All of these intersection points and the inline single-Z line segments extending through them may also be seen and cross referenced in FIGS. 6C and 6D.

Similarly, FIG. 6C shows an xline multi-Z polyline 604, a top horizon single-Z line segment 27 resulting therefrom, a bottom horizon single-Z line segment 48 resulting therefrom, and four intersection points 0, 1, 4, and 5 that are intersected, respectively, by four inline single-Z line segments 21, 42, 23, and 46. All of these intersection points and the single-Z line segments extending through them may also be seen and cross referenced in FIGS. 6A and 6B.

Finally, FIG. 6D shows two xline multi-Z polylines 606 and 608, two xline single-Z line segments 29 and 50 resulting from the first polyline 606, and two xline single-Z line segments 31 and 52 resulting from the second polyline 608. As well, there are two intersection points 6 and 7 along the first polyline 606 that are intersected, respectively, by the inline single-Z line segments 23 and 44, and four intersection points 2, 3, 8, and 9 along the second polyline 608 that are intersected, respectively, by the inline single-Z line segments 21, 42, 25, and 46. All of these intersection points and the single-Z line segments extending through them may also be seen and cross referenced in FIGS. 6A and 6B.

A simplistic example to illustrate the single-Z conversion concepts discussed above is provided below in Tables 1, 2 and 3. In this example, the tables are rough facsimiles of a portion of the 2-D arrays or grids of a given multi-Z polyline for a geologic structure. Referring to Table 1, there are two values in Z at point X=1 and Y=3 of the polyline, namely, Z=4 and 24. Tables 2 and 3 are the top and bottom horizon single-Z line segments, respectively, corresponding to the polyline after it has been converted according to the exemplary embodiments disclosed herein. As can be seen in Tables 2 and 3, there is now only one value in Z for each line segment at point X=1 and Y=3.

TABLE 1

Multi-Z Polyline

| X | Y | Z |
|---|---|---|
| ... | ... | ... |
| 1 | 3 | 4, 24 |
| ... | ... | ... |

TABLE 2

Top Horizon Single-Z Segment

| X | Y | Z |
|---|---|---|
| ... | ... | ... |
| 1 | 3 | 4 |
| ... | ... | ... |

TABLE 3

Bottom Horizon Single-Z Segment

| X | Y | Z |
|---|---|---|
| ... | ... | ... |
| 1 | 3 | 24 |
| ... | ... | ... |

Figure 7:
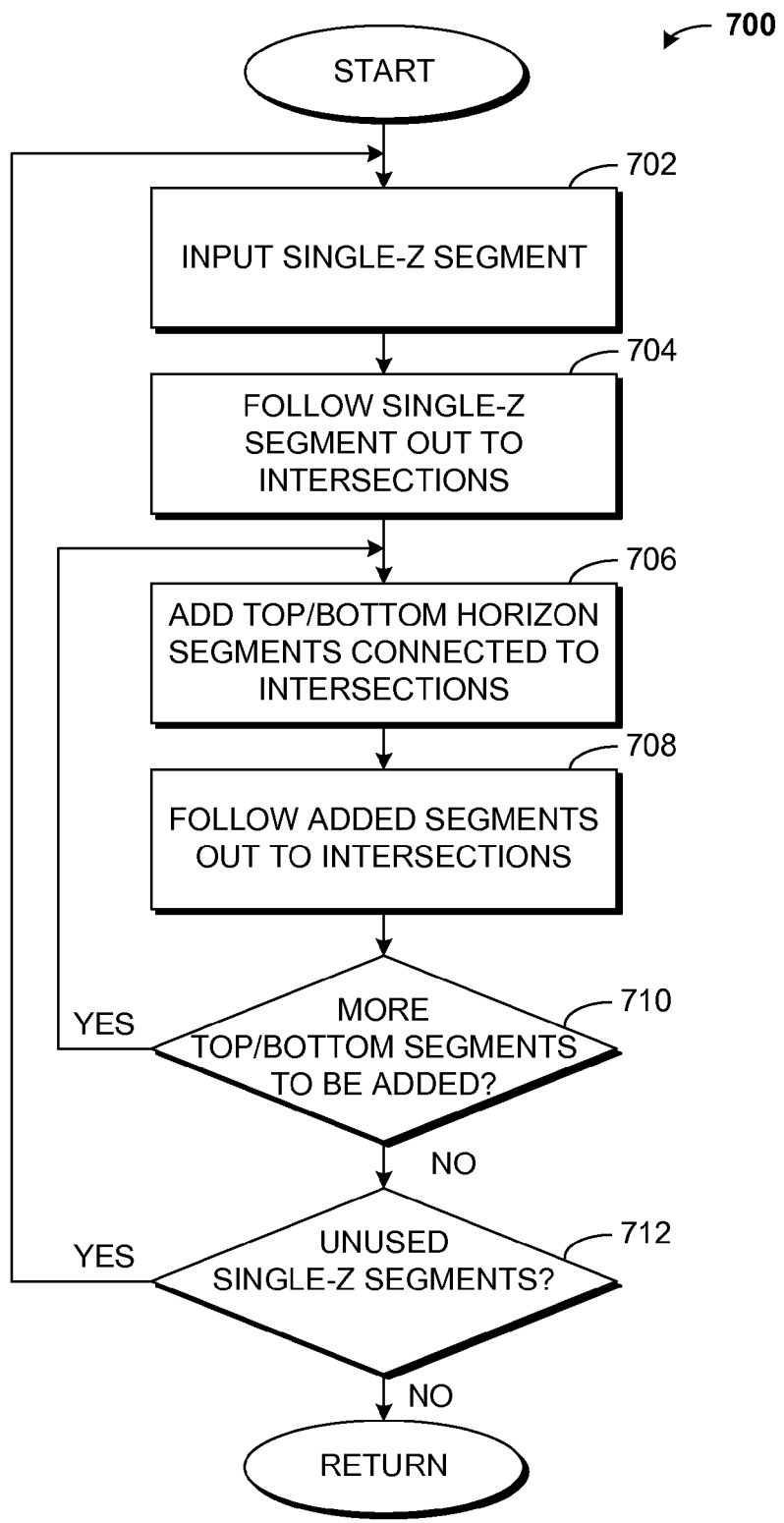
FIG. 7 is an exemplary flowchart that may be used for adding single-Z line segments to a lattice according to the exemplary disclosed embodiments.

Once the single-Z line segments have been identified for the various multi-Z polylines, the single-Z conversion module 220, and specifically the lattice generation sub-module 302 therein, may assemble or otherwise group the line segments together to form lattices, as depicted in block 408 (see FIG. 4). An example of creating a lattice is shown in FIG. 7 in the form of a flowchart 700. In general, lattice creation starts with receiving or inputting a single-Z line segment for a given multi-Z polyline at block 702. Next, based on whether the received single-Z line segment is a top horizon line segment (long dash) or a bottom horizon line segment (dash-dot), additional top or additional bottom horizon line segments may be added to the lattice. In particular, the received single-Z line segment is traced or followed out to its intersection points at block 704, and any top or bottom horizon single-Z line segments crossing through or connected to the intersection points are added accordingly at block 706. At block 708, the newly added single-Z line segments are traced or followed out to their respective intersection points. A determination is then made at block 710 whether there are any additional top or additional bottom horizon single-Z line segments that need to be added to the lattice. If the determination is yes, then the previous adding steps at blocks 706 and 708 are repeated, and the process continues in a recursive manner until all intersection points branching off from the initial single-Z line segment have been walked, and all top or bottom single-Z line segments connected to those intersection points have been added to the lattice accordingly.

If the determination at block 710 is no, then a determination is made at block 712 whether any unused single-Z line segments, that is, any single-Z line segments that have not been added to a lattice, remain. If the determination is yes, then the process returns to block 702 and a new lattice is started from the unused single-Z line segment. If the determination is no, then the process is terminated.

Figure 8A:
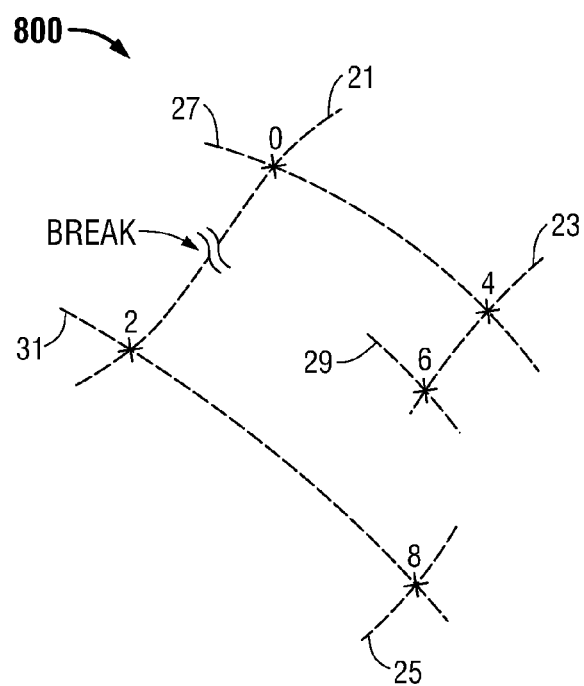
FIGS. 8A-8C are exemplary lattices composed of single-Z line segments according to the exemplary disclosed embodiments.
Figure 8B:
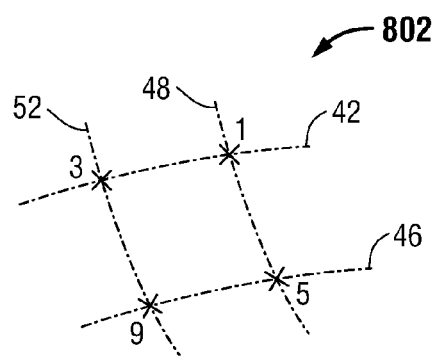
Figure 8C:
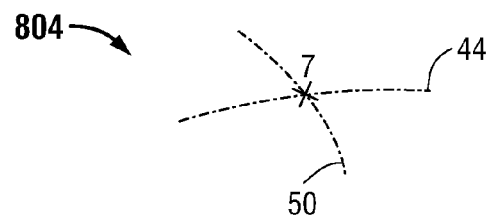

FIGS. 8A-8C illustrate examples of single-Z line segments grouped together by the single-Z conversion module 220 to form lattices according to the exemplary embodiments discussed above. In the example of FIG. 8A, a top horizon lattice 800 is shown having five of the intersection points 0, 2, 4, 6, and 8 initially discussed with respect to FIGS. 6A-6D. These intersection points are connected to each other by the single-Z line segments 21, 23, 25, 27, 29, and 31, to form the lattice 800 as shown. In a similar manner, FIG. 8B shows a lattice 802 having four intersection points 1, 3, 5, and 9 that are connected to one another by the bottom horizon single-Z line segments 42, 46, 48, and 52. FIG. 8C shows a lattice 804 having one intersection point 7 and two bottom horizon single-Z line segments 44 and 50.

Figure 9:
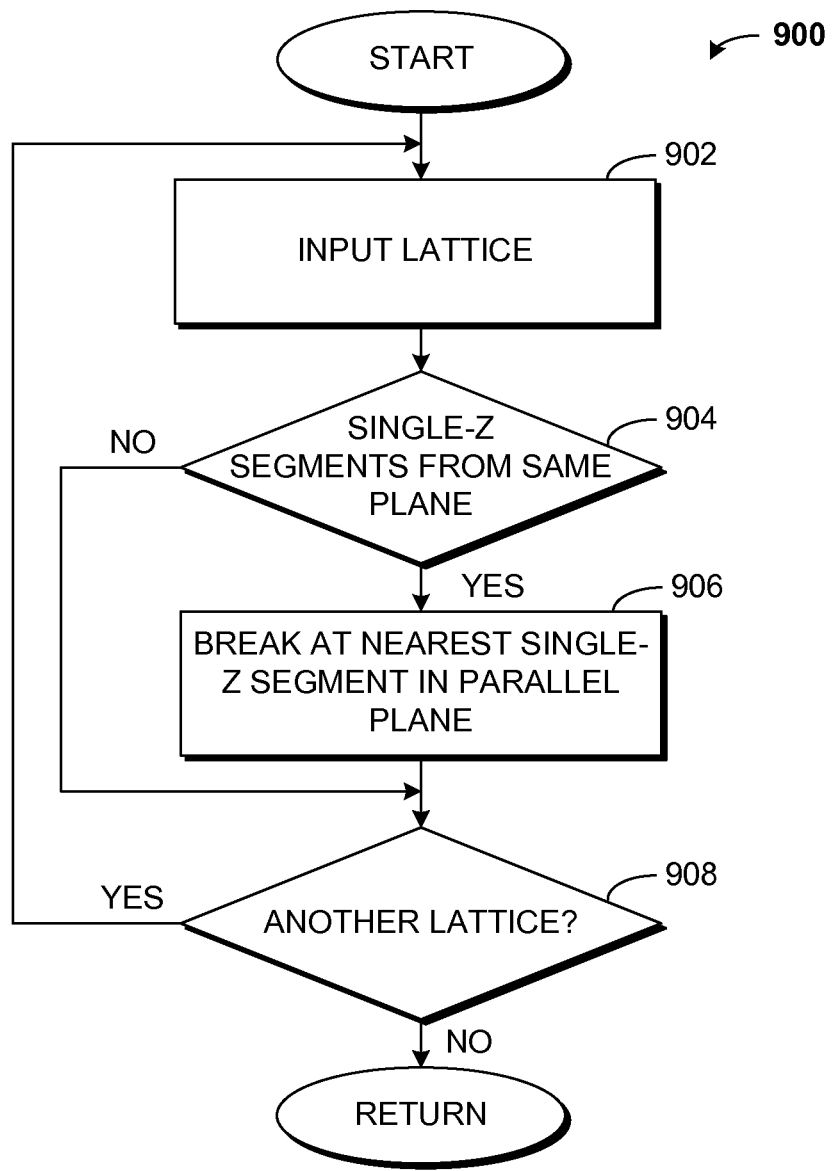
FIG. 9 is an exemplary flowchart that may be used for rationalizing single-Z lattices according to the exemplary disclosed embodiments.

Due to the way the single-Z conversion module 220 constructs the lattices in some embodiments, it may be possible for a lattice to fold back over itself and overlap itself. One option for preventing this overlapping is to rationalize or break up the lattices so that no lattice contains single-Z line segments that lie in the same inline or xline plane, as discussed with respect to block 410 (see FIG. 4). FIG. 9 shows an example of the single-Z conversion module 220, and specifically the lattice rationalization sub-module 304 therein, rationalizing a lattice in accordance with the exemplary disclosed embodiments. In general, referring to the flowchart 900 in FIG. 9 rationalization begins with receiving an inline or xline lattice at block 902. At block 904, a determination is made whether any of the single-Z line segments in the lattice share the same plane. If the determination is yes, then at block 906, the lattice is broken at whichever single-Z line segment is: 1) nearest to the single-Z line segments sharing a plane, and 2) in a plane parallel to the shared plane.

If the determination at block 904 is no, then a determination is made at block 908 whether any additional lattices need to be rationalized. If yes, then the process returns to block 902 for additional lattice rationalization. If no, then the process terminates.

Turning back to FIG. 8A, the top horizon lattice 800 shown here is an example of a lattice that has been rationalized by the single-Z conversion module 220. As depicted, the top horizon lattice 800 includes two single-Z line segments 23 and 25 that share the same plane, namely, inline plane B (see FIG. 6B). In accordance with the exemplary disclosed embodiments, the single-Z conversion module 220 has determined the single-Z line segment 21 to be the nearest line segment that also resides in a plane parallel to the single-Z line segments 23 and 25 (see FIG. 6A). The single-Z line segments 27, 29, and 31, on the other hand, reside in different xline planes C and D (see FIGS. 6C and 6D). Therefore, the single-Z conversion module 220 has broken the top horizon lattice 800 at the single-Z line segment 21 such that the single-Z line segments 23 and 25 no longer have a continuous, unbroken path between them via the single-Z line segment 21. This may be achieved in the example of FIG. 8A by breaking the single-Z line segment 21 between the intersection points 0 and 2.

In contrast, the single-Z conversion module 220 does not need to break up the bottom horizon lattice 802 in FIG. 8B because none of its single-Z line segments 42, 46, 48, or 52 share the same plane. This may be verified by reference to FIGS. 6A-6D, which shows each of the single-Z line segments 42, 46, 48, and 52 residing in different planes from one another. Likewise, the bottom horizon lattice 804 in FIG. 8C also does not need to be broken up, as none of its single-Z line segments 44 and 50 share the same plane (see FIGS. 6B and 6D).

Thus, as set forth above, the embodiments disclosed herein may be implemented in a number of ways. In general, in one aspect, the exemplary disclosed embodiments relate to a computer-based imaging system for imaging a geologic structure in a subterranean formation. The system comprises, among other things, a central processing unit mounted within the computer-based imaging system, a display electrically connected to the central processing unit and displaying a three-dimensional (3-D) image of the geologic structure, and a data input unit electrically connected to the central processing unit, the data input unit receiving seismic interpretations for the geologic structure, the seismic interpretations comprising interpretations of data acquired from a seismic reflection survey taken of the subterranean formation. The system further comprises a storage device electrically connected to the central processing unit and storing an imaging application executable by the central processing unit to render the seismic interpretations as multi-Z polylines, each multi-Z polyline being composed of a series of sample points defining a different contour of the geologic structure within a given plane, and each multi-Z polyline having a plurality of intersection points where the multi-Z polyline intersects other multi-Z polylines. The storage device further stores a single-Z conversion module executable by the central processing unit to convert the multi-Z polylines into single-Z line segments such that each multi-Z polyline is converted into a set of contiguous single-Z line segments, and each single-Z line segment has only one value in Z at any point along the single-Z line segment.

In general, in another aspect, the exemplary disclosed embodiments relate to a computer-based method of imaging a geologic structure in a subterranean formation. The method comprises, among other steps, receiving seismic interpretations for the geologic structure through a data input unit, the seismic interpretations comprising interpretations of data acquired from a seismic reflection survey taken of the subterranean formation. The method further comprises rendering the seismic interpretations as multi-Z polylines using a central processing unit, each multi-Z polyline being composed of a series of sample points defining a different contour of the geologic structure within a given plane, and each polyline having a plurality of intersection points where the multi-Z polyline intersects other multi-Z polylines. The multi-Z polylines are converted into single-Z line segments using the central processing unit such that each multi-Z polyline is converted into a set of contiguous single-Z line segments, and each single-Z line segment has only one value in Z at any point along the single-Z line segment.

In general, in yet another aspect, the exemplary disclosed embodiments relate to a computer-readable medium storing computer-readable instructions for causing a computer to image a geologic structure in a subterranean formation. The computer-readable instructions comprise instructions for causing the computer to, among other things, receive seismic interpretations for the geologic structure, the seismic interpretations comprising interpretations of data acquired from a seismic reflection survey taken of the subterranean formation the computer readable instructions further comprise instructions for causing the computer to render the seismic interpretations as multi-Z polylines, each multi-Z polyline being composed of a series of sample points defining a different contour of the geologic structure within a given plane, and each polyline having a plurality of intersection points where the multi-Z polyline intersects other multi-Z polylines. The multi-Z polylines are converted into single-Z line segments such that each multi-Z polyline is converted into a set of contiguous single-Z line segments, and each single-Z line segment has only one value in Z at any point along the single-Z line segment.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the exemplary disclosed embodiments as defined in the appended claims.

What is claimed is:

1. A computer-based imaging system for imaging a geologic structure in a subterranean formation, comprising:
   a central processing unit mounted within the computer-based imaging system;
   a display electrically connected to the central processing unit and displaying a three-dimensional (3-D) image of the geologic structure;
   a data input unit electrically connected to the central processing unit, the data input unit receiving seismic interpretations for the geologic structure, the seismic interpretations comprising interpretations of data acquired from a seismic reflection survey taken of the subterranean formation; and
   a storage device electrically connected to the central processing unit, the storage device storing therein an imaging application executable by the central processing unit to render the seismic interpretations as multi-Z polylines, each multi-Z polyline being composed of a series of sample points defining a different contour of the geologic structure within a given plane, and each multi-Z polyline having a plurality of intersection points where the multi-Z polyline intersects other multi-Z polylines;
   wherein the storage device further stores therein a single-Z conversion module executable by the central processing unit to convert the multi-Z polylines into single-Z line segments, each multi-Z polyline being converted into a set of contiguous single-Z line segments, each single-Z line segment having only one value in Z at any point along the single-Z line segment;
   the storage device further storing therein a single-Z line segment identification sub-module executable by the central processing unit to determine whether a slope of the multi-Z polyline reversed sign from positive to negative or vice versa between sample points N−1 and N and sample points N and N+1, and identify a new single-Z line segment starting at sample point N in response to the slope reversing sign.

2. The computer-based imaging system of claim 1, wherein the single-Z line segment identification sub-module is further executable by the central processing unit to assign a unique identifier to each single-Z line segment.

3. The computer-based imaging system of claim 1, further comprising a lattice generation sub-module executable by the central processing unit to group the single-Z line segments from the multi-Z polylines into lattices, each lattice composed of single-Z line segments that belong in a common horizon and are connected to each other by a common intersection point.

4. The computer-based imaging system of claim 3, wherein the common horizon is one of a top horizon or a bottom horizon for the geologic structure.

5. The computer-based imaging system of claim 3, further comprising a lattice rationalization sub-module executable by the central processing unit to rationalize the lattices such that no lattice contains single-Z line segments that share a common plane.

6. The computer-based imaging system of claim 5, wherein the lattice rationalization sub-module rationalizes a lattice by breaking the lattice at whichever single-Z line segment is: i) nearest to the single-Z line segments sharing a common plane, and ii) in a plane parallel to the common plane.

7. A computer-based method of imaging a geologic structure in a subterranean formation, comprising:
   receiving seismic interpretations for the geologic structure through a data input unit, the seismic interpretations comprising interpretations of data acquired from a seismic reflection survey taken of the subterranean formation;
   rendering the seismic interpretations as multi-Z polylines using a central processing unit, each multi-Z polyline being composed of a series of sample points defining a different contour of the geologic structure within a given plane, and each polyline having a plurality of intersection points where the multi-Z polyline intersects other multi-Z polylines;
   converting the multi-Z polylines into single-Z line segments using the central processing unit, each multi-Z polyline being converted into a set of contiguous single-Z line segments, each single-Z line segment having only one value in Z at any point along the single-Z line segment; and
   using the central processing unit to determine whether a slope of the multi-Z polyline reversed sign from positive to negative or vice versa between sample points N−1 and N and sample points N and N+1, and identify a new single-Z line segment starting at sample point N in response to the slope reversing sign.

8. The computer-based imaging method of claim 7, further comprising using the central processing unit to assign a unique identifier to each single-Z line segment.

9. The computer-based imaging method of claim 7, further comprising using the central processing unit to group the single-Z line segments from the multi-Z polylines into lattices, each lattice composed of single-Z line segments that belong in a common horizon and are connected to each other by a common intersection point.

10. The computer-based imaging method of claim 9, wherein the common horizon is one of a top horizon or a bottom horizon for the geologic structure.

11. The computer-based imaging method of claim 9, further comprising using the central processing unit to rationalize the lattices such that no lattice contains single-Z line segments that share a common plane.

12. The computer-based imaging method of claim 11, wherein each lattice is rationalized by breaking the lattice at whichever single-Z line segment is: i) nearest to the single-Z line segments sharing a common plane, and ii) in a plane parallel to the common plane.

13. A non-transitory computer-readable medium storing computer-readable instructions for causing a computer to image a geologic structure in a subterranean formation, the computer-readable instructions comprising instructions for causing the computer to:

receive seismic interpretations for the geologic structure, the seismic interpretations comprising interpretations of data acquired from a seismic reflection survey taken of the subterranean formation;

render the seismic interpretations as multi-Z polylines, each multi-Z polyline being composed of a series of sample points defining a different contour of the geologic structure within a given plane, and each polyline having a plurality of intersection points where the multi-Z polyline intersects other multi-Z polylines;

convert the multi-Z polylines into single-Z line segments, each multi-Z polyline being converted into a set of contiguous single-Z line segments, each single-Z line segment having only one value in Z at any point along the single-Z line segment; and determine whether a slope of the multi-Z polyline reversed sign from positive to negative or vice versa between sample points N−1 and N and sample points N and N+1, and identify a new single-Z line segment starting at sample point N in response to the slope reversing sign.

14. The non-transitory computer-readable medium of claim 13, wherein the computer-readable instructions further comprise instructions for causing the computer to assign a unique identifier to each single-Z line segment.

15. The non-transitory computer-readable medium of claim 13, wherein the computer-readable instructions further comprise instructions for causing the computer to group the single-Z line segments from the multi-Z polylines into lattices, each lattice composed of single-Z line segments that belong in a common horizon and are connected to each other by a common intersection point.

16. The non-transitory computer-readable medium of claim 15, wherein the computer-readable instructions further comprise instructions for causing the computer to rationalize the lattices such that no lattice contains single-Z line segments that share a common plane.

17. The non-transitory computer-readable medium of claim 16, wherein the computer-readable instructions further comprise instructions for causing the computer to rationalize each lattice by breaking the lattice at whichever single-Z line segment is: i) nearest to the single-Z line segments sharing a common plane, and ii) in a plane parallel to the common plane.

* * * * *